United States Patent [19]
Rafferty

[11] Patent Number: 5,377,018
[45] Date of Patent: Dec. 27, 1994

[54] VIDEO COMPRESSION AND DECOMPRESSION USING BLOCK SELECTION AND SUBDIVISION

[75] Inventor: James M. Rafferty, Redwood City, Calif.

[73] Assignee: Media Vision, Fremont, Calif.

[21] Appl. No.: 902,325

[22] Filed: Jun. 22, 1992

[51] Int. Cl.$^5$ ............................................. H04B 1/415
[52] U.S. Cl. ..................................... 358/433; 358/443
[58] Field of Search .................. 358/42.5, 261.1–261.4, 358/262.1, 443, 432, 433, 133, 135, 136; 382/41, 56; 345/420, 421

[56] References Cited

U.S. PATENT DOCUMENTS 5,107,345  4/1992  Lee ........................................ 358/432

Primary Examiner—Edward L. Coles, Sr.
Assistant Examiner—Jerome Grant, II
Attorney, Agent, or Firm—Claude A. S. Hamrick

[57] ABSTRACT

A frame of digitized video data is compressed by dividing the frame into a plurality of rectangular blocks each typically measuring 4 pixels by 4 pixels. The entropy of each block is determined by measuring the difference between a maximum luminance of any pixel in the block and the minimum luminance of any pixel in the block. Those blocks which have a luminance value above a predetermined threshold (such as the average luminance for the block) are then subdivided into four blocks each including four pixels. Then, for each sub-block of 4 pixels a conventional video color compression technique is applied. For the non-subdivided blocks i.e., where the maximum luminance difference is below the threshold, the entire block is video compressed into a high color value and a low color value which are typically averages of the higher luminance and lower luminance group pixels respectively. Thus, some blocks are adaptively subdivided or not with greater video compression being provided for those blocks with relatively smaller variations in internal video information between the pixels and with the other blocks being subdivided to provide more video information and hence less compression. This results in a relatively high video compression ratio especially suitable for implementation by computer software.

22 Claims, 7 Drawing Sheets

| MASK WORD |

| RGB HIGH VALUE WORD | RGB LOW VALUE WORD | Sub-block #0
| RGB HIGH VALUE WORD | RGB LOW VALUE WORD | Sub-block #1
| RGB HIGH VALUE WORD | RGB LOW VALUE WORD | Sub-block #2
| RGB HIGH VALUE WORD | RGB LOW VALUE WORD | Sub-block #3

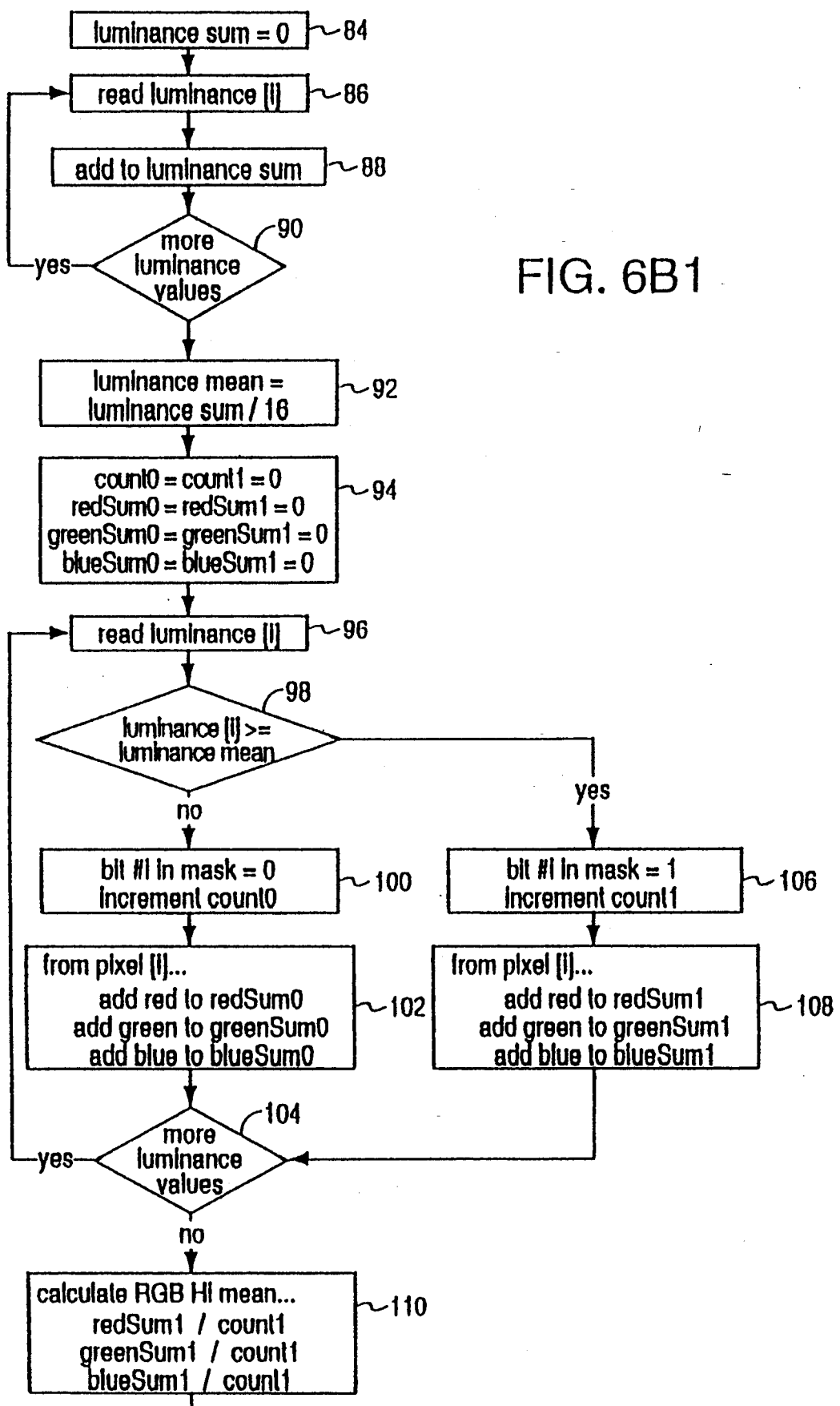
FIG. 6B1

FIG. 6B2

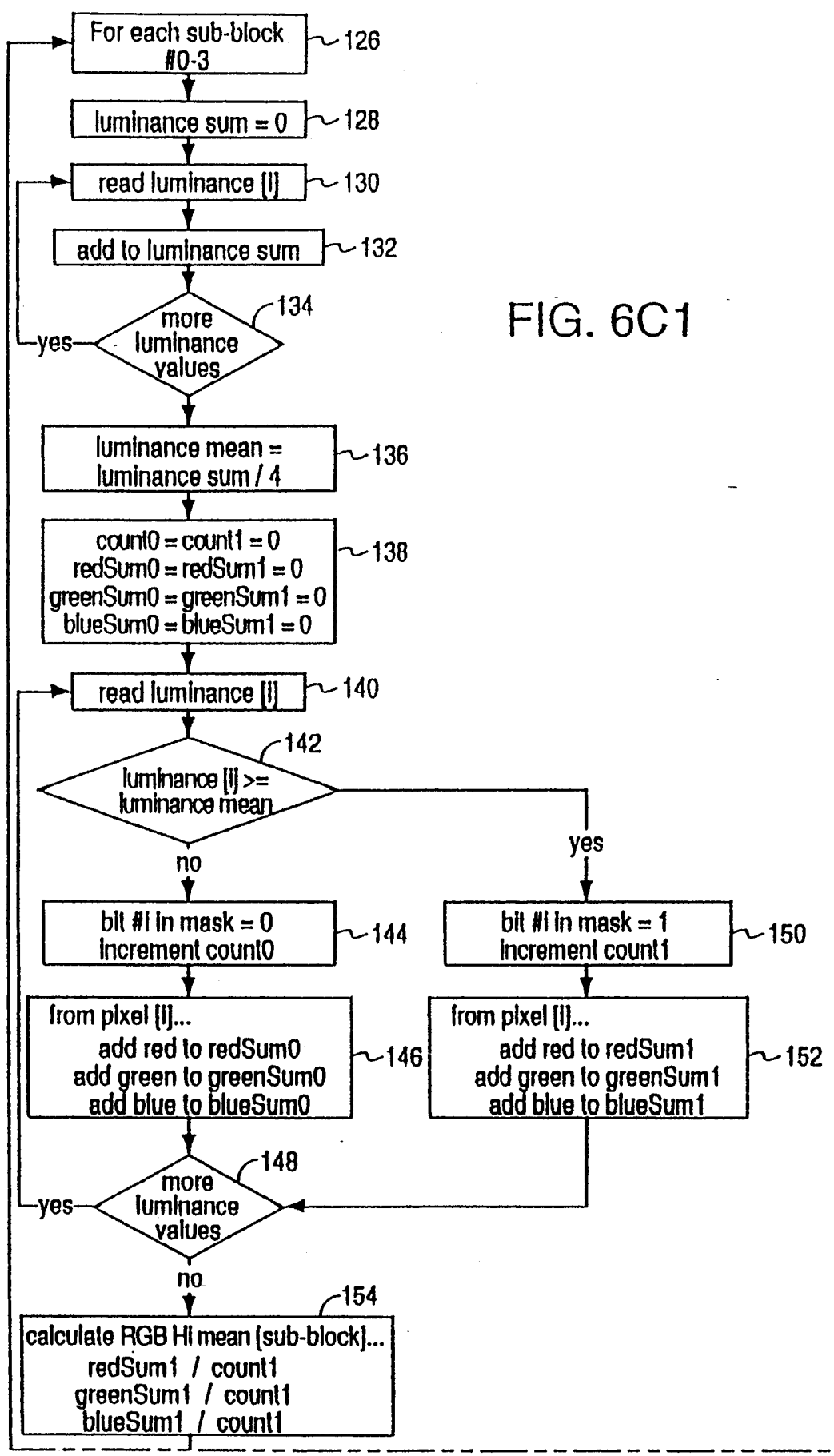
FIG. 6C1

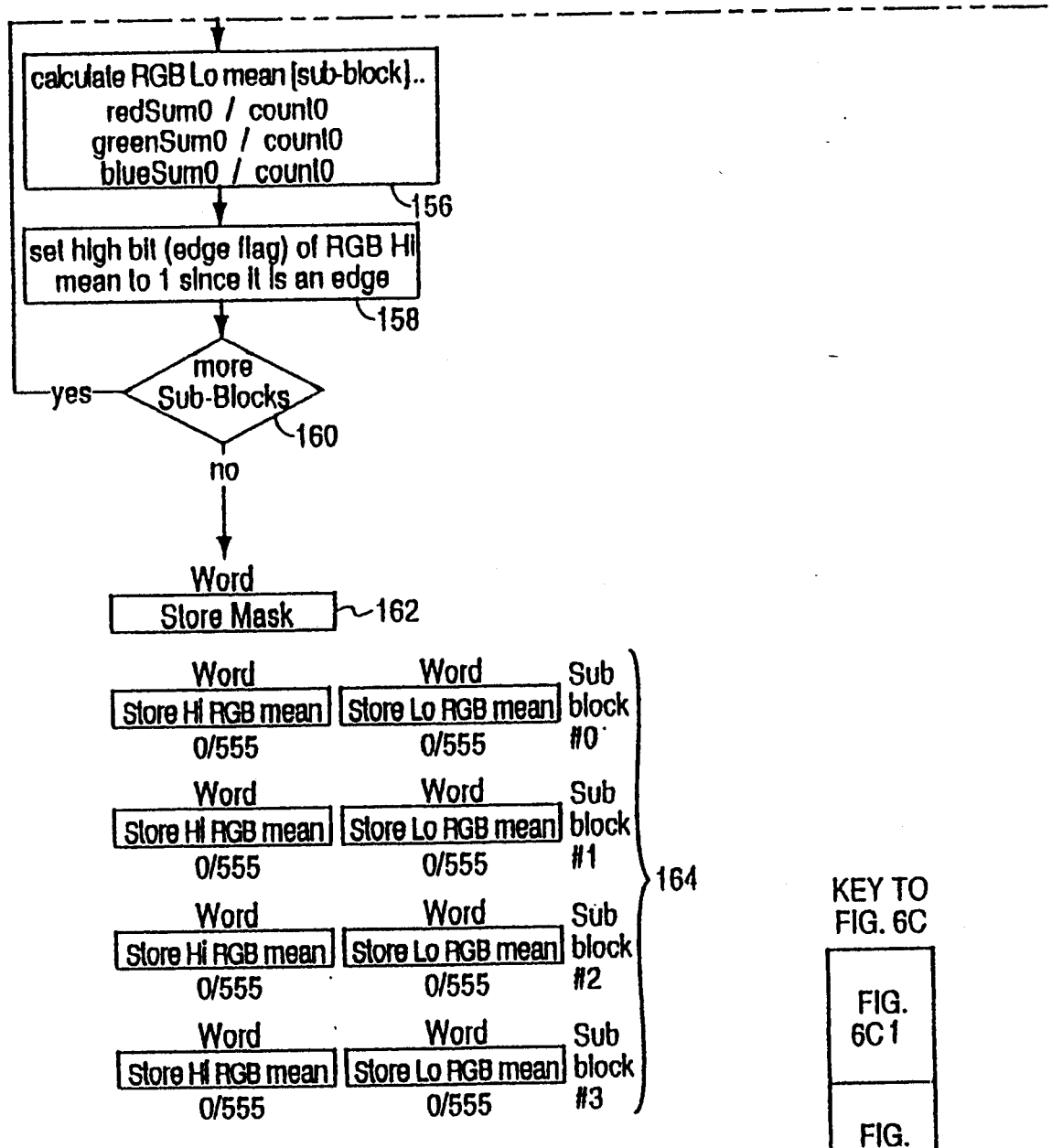
FIG. 6C2

VIDEO COMPRESSION AND DECOMPRESSION USING BLOCK SELECTION AND SUBDIVISION

FIELD OF THE INVENTION

This invention relates to video compression and decompression and especially to a video compression method which divides a video frame into blocks and compresses selected blocks more than others.

BACKGROUND OF THE INVENTION

Video compression and decompression are well known techniques for reducing either the bandwidth or the amount of memory needed to respectively carry or store video i.e., television-type signals. Video compression typically eliminates unnecessary information content from the signal. Well known methods of video compression include for instance color cell compression (CCC), joint photographics expert group (JPEG) compression and block truncation coding (BTC) compression. However, there is still a need for other compression methods especially those which address specific compression situations. For instance, it is frequently desirable in a computer system to store video information in a computer memory or disk drive. Since video information involves a large amount of data per video image or frame, compression is especially important in this context to reduce the required amount of memory. Many prior art compression methods require dedicated electronic circuitry, the need for which substantially increases the cost of video compression in conjunction with a personal computer system. Thus there is a need for video compression methods which provide compression additional over that of the prior art and which may be implemented in computer software only in conjunction with conventional personal computer hardware i.e., microprocessor, main memory, and disk drive.

SUMMARY OF THE INVENTION

In accordance with the invention, a conventional frame of video information is compressed by dividing the image frame into a plurality of rectangular blocks. Those blocks which are determined to include internally a relatively small variation in information, each block which in one embodiment includes sixteen (16) pixels, is compressed into two RGB color values. However, for other blocks which include a relatively higher internal variation in information, the block is subdivided for instance into four (4) sub-blocks and each sub-block is then expressed as two color values. Thus advantageously the amount of subdivision is determined by the content of each block, i.e. the amount of compression applied is adaptive to the information content of a particular block.

Therefore, the amount of compression applied is dependent upon the local information content of the image and varies from portion to portion of the image. Typically the parameter used to determine if a block should be subdivided is the variation in luminance between the pixels in a block. In accordance with one embodiment of the invention, the blocks are subdivided only about 30% of the time i.e., the majority of the blocks are not subdivided, resulting in a compression value of about 3 to 4 bits per pixel (versus uncompressed video which is 24 bits per pixel). Therefore, it is possible to implement this compression technique so that decompression, which is the mirror image of the compression, will allow showing of a small video image (typically 160×120 pixels) at approximately 15 frames per second using a conventional personal computer for decompression. Also advantageously the method in accordance with the invention may be implemented on such a personal computer without any dedicated electronic circuitry i.e., using only the conventionally present elements of the computer, with the process controlled by a computer program. Thus while the compression here is not as effective as some other well known compression techniques, it is implementable by a computer program only without the need for any additional equipment.

BRIEF DESCRIPTION OF THE DRAWINGS

FIG. 2 is a view of a mask word for the four-by-four block of FIG. 2 according to one embodiment of the present invention.

FIGS. 6A, 6B1, 6B2, 6C1 and 6C2 is a view of a four color data words for the four-by-four block of FIG. 4 according to one embodiment of the present invention.

FIGS. 7A–7C are a flow diagram of one embodiment of the present invention.

DETAILED DESCRIPTION OF THE PREFERRED EMBODIMENTS

Figure 1:
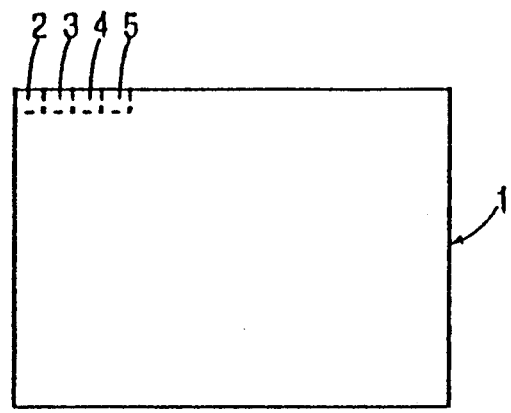
FIG. 1 is a view of a frame image of one frame of pixels.

FIG. 1 is a view of a frame image 1 of a plurality of individual RGB (red, blue, green) pixels conventionally displayed on a screen such as a phosphor screen of a cathode ray tube. Typically, for digitized video 24 bits of video data are used to represent the video information for each RGB pixel: eight for the red pixel, eight for the green pixel, and eight for the blue pixel.

According to one embodiment of the present invention, a frame image of video information is compressed by dividing the image frame of RGB pixels into a plurality of individual rectangular blocks 2–5. Each of these individual blocks 2–5 could comprise a 4×4 block of RGB pixels, a 6×6 block of RGB pixels, a 8×8 block of RGB pixels, et cetera. In the illustrative embodiment described here and shown in FIG. 2, each such block is a 4×4 block of sixteen RGB pixels P0–P15. Because each RGB pixel is conventionally represented by 24 bits of data, each individual block requires 384 bits of uncompressed video data to represent its pixels.

To compress the pixel information according to the present invention, the "entropy" of each block is determined in order to determine how much to compress that block. A block with a high degree of entropy is conventionally defined as a block that carries a relatively large amount of information whereas a block with a low degree of entropy is defined as a block that carries a relatively small amount of information. By compressing blocks exhibiting high degrees of entropy to a lesser amount than blocks exhibiting low degrees of entropy, the total amount of compression performed on a frame image can be maximized while minimizing the amount of information lost due to compression.

According to the present invention, an entropy value is computed for each successive block of pixels and that entropy value is compared with a predetermined entropy value. If the entropy value of the present block is less than or equal to the predetermined entropy value, the present block will receive a greater amount of compression. If, on the other hand, the entropy value of the present block is greater than the predetermined entropy value, then the present block will receive a lesser amount of compression. In some embodiments, the predetermined entropy value may be chosen by the user.

Although various techniques may be employed to determine the entropy of each block of the image frame, the presently described embodiment uses the magnitude of the difference in luminance between the pixel having the highest luminance in the block and the pixel having the lowest luminance in the block. Luminance conventionally is the gray scale of the image, independent of the colors. The luminance maximum and minimum determine how much variation ("entropy") is present in a block. This measure of entropy may, for example, yield a higher entropy value for a block spanning the edge of a bright object on a dark background than for a block comprising only dark pixels of the background. More compression will therefore be performed on the background block than on the block spanning the edge of the bright object.

If the present block of pixels has been determined to be a high entropy block, the block will be subdivided into multiple smaller sub-blocks. If, on the other hand, the present block is determined to be a low entropy block, then the block is not further subdivided.

Figure 2:
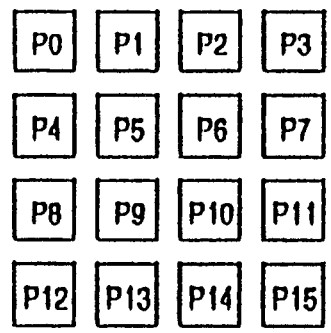
FIG. 2 is a view of a four-by-four block of pixels according to one embodiment of the present invention.
Figure 3:
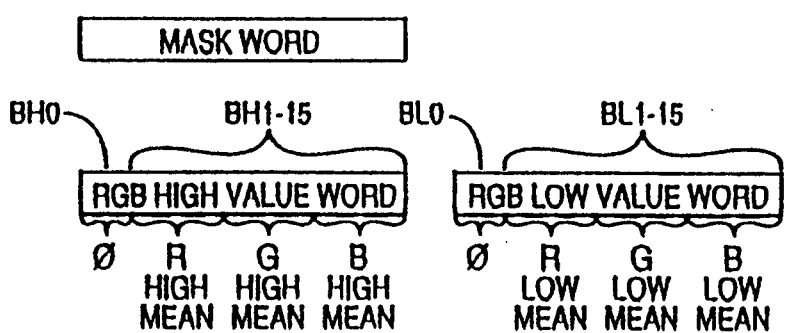
FIG. 3 is a view of a color data word for the four-by-four block of FIG. 2 according to one embodiment of the present invention.

The case in which a 4×4 block of pixels is not subdivided will be described first in connection with FIGS. 2 and 3. The luminance of each of the sixteen pixels P0–P15 of the block is first compared with the average luminance of the block. If, for example, the luminance of pixel P0 is greater than the average luminance of the block, then a first bit of a 16-bit output mask word is set to a "1". If, on the other hand, the luminance of pixel P0 is equal to or less than the average luminance of the block, then the first bit of the output mask word is set of a "0". Because each of the sixteen bits of the output mask word corresponds with one of the pixels P0–P15 of the block, the mask word contains information indicating whether the luminance of each of the pixels is greater than or less than the average luminance of the block a whole. Instead of setting a threshold between high and low blocks at an average, in another embodiment this threshold is a user selectable parameter, allowing the user to adjust quality versus compression of the image. It has been found that a computed luminance maximum value minus minimum value of 40 (on a scale of 0 to 255) typically results in about 30% of the blocks being subdivided and also results in good quality video upon decompression.

After the 16-bit mask word has been generated, the pixels of the block are grouped into a high luminance group or into a low luminance group depending on the value of the bit in the mask word corresponding with the pixel. Three mean values are then generated for each of the two groups of pixels. For the group of high luminance pixels, a mean of all the 8-bit red values of all the high luminance pixels is computed; a mean of all the 8-bit green values of all the high luminance pixels is computed; a mean of all the 8-bit blue values of all the high luminance pixels is computed. Similarly, for the group of low luminance pixels, a mean of all the 8-bit red values of all the low luminance pixels is computed; a mean of all the 8-bit green values of all the low luminance pixels is computed; a mean of all the 8-bit blue values of all the low luminance pixels is computed.

To compress these three 8-bit means into two 16-bit output words, the three least significant bits of each 8-bit mean are truncated to result in three 5-bit values. The three 5-bit high luminance mean values are then concatenated to form fifteen bits BH1–BH15 of a single 16-bit RGB high value word. The remaining bit of the RGB high value word, bit BH0, is set to a "0". The three 8-bit means of the low luminance pixels are similarly truncated and concatenated to form fifteen bits BL1–BL15 of a single 16-bit RGB low luminance value word. Again, the remaining bit, bit BL0, is set to a "0".

Accordingly, each low entropy block is compressed into three 16-bit words: one mask word; one RGB high value word starting with a "0" bit BH0; and one RGB low value work starting with a "0" bit BL0. Three 16-bit words comprise a total of 48 bits. The uncompressed video data comprises three 8-bit words for each of sixteen pixels for a total of 384 bits. The presently described embodiment therefore results in 384/48 video data compression for low entropy blocks.

Figures 4, 5:
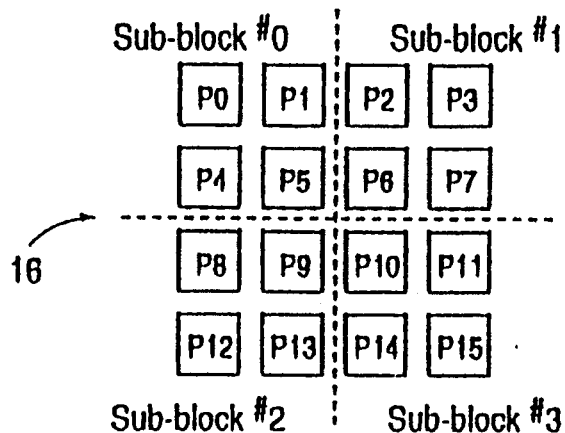
FIG. 4 is a view of a four-by-four block subdivided into four sub-blocks of pixels according to one embodiment of the present invention.
FIG. 5 is a view of a mask word for the four-by-four block of FIG. 4 according to one embodiment of the present invention.
Figure 6A:
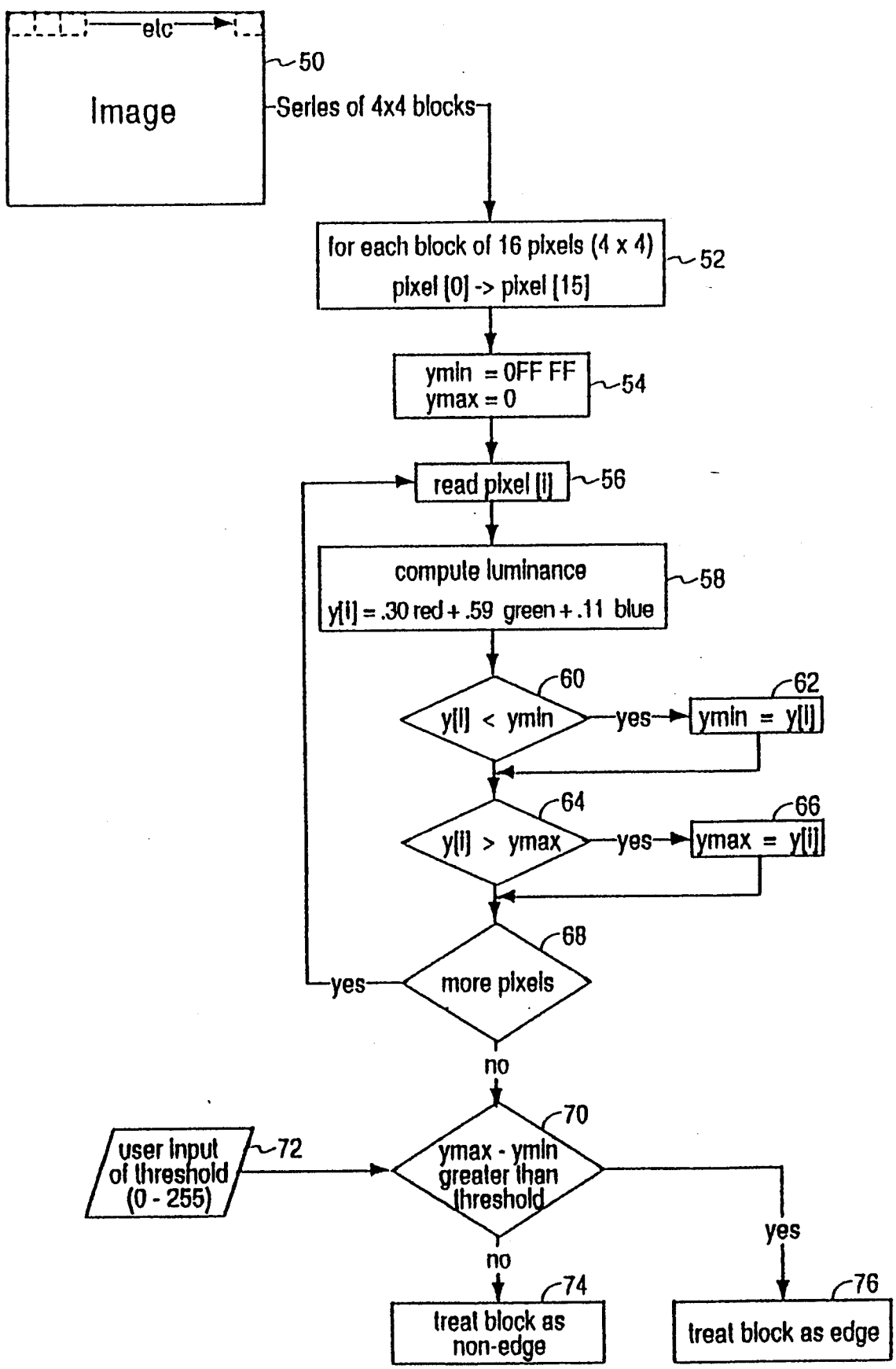
Figure 6B:
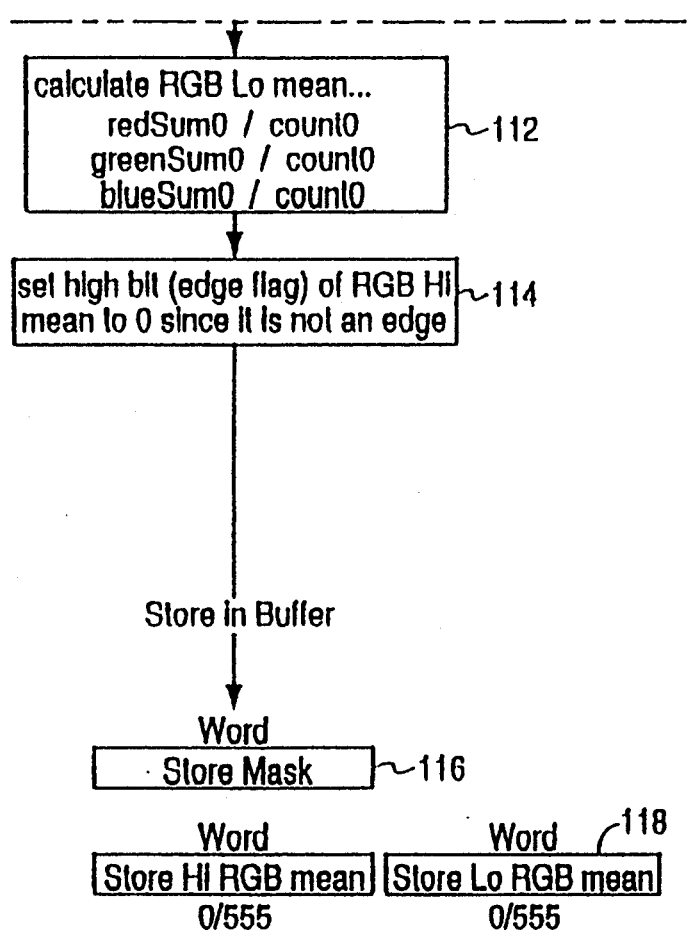
Figure 6B:
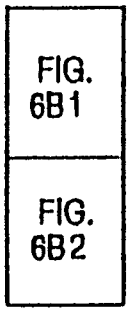

If the block is determined to a high entropy block, however, compression is performed differently. The compression of a high entropy sub-block 16 will be described in connection with FIGS. 4 and 5. High entropy block 16 is divided into four sub-blocks SB0–SB3.

First, a mean luminance value is computed for sub-block #0 by averaging each of the four pixels P0, P1, P4 of the sub-block. The luminance of each individual pixel of the sub-block #0 is then compared with the mean luminance of the sub-block. Pixels having a luminance greater than the mean luminance for the sub-block cause a corresponding bit in a 16-bit mask word to be set to "1". Pixels having a luminance equal to of less than the mean luminance for the sub-block cause the corresponding bit to be set to a "0". The pixel of the sub-block are then grouped into high luminance and low luminance groups. A mean of all the red values of all the high luminance pixels of the sub-block is determined; a mean of all the green values of all the high luminance pixels of the sub-block is determined; and a mean of all the blue values of all the high luminance pixels of the sub-block is determined. Similarly, a mean of all the red values of all the low luminance pixels of the sub-block is determined; a mean of all the green values of all the low luminance pixels of the sub-block is determined; and a mean of all the blue values of all the low luminance pixels of the sub-block is determined. The red, green, and blue high luminance means are then truncated into 5-bit means and concatenated to form fifteen bits of a 16-bit RGB high value word for the first sub-block #0. The first bit of this RGB high value word is, however, set to a "1" to distinguish the compressed data of the subdivided block from the compressed data of other unsubdivided blocks. The red, green, and blue low luminance means are also truncated into 5-bit means and concatenated to form a 16-bit RGB low value word for the first sub-block #0. The first bit of the RGB high value word is set to a "0" indicating the compressed data of undivided blocks.

The compression method of the present invention then proceeds to compress the pixels P2, P3, P6 and P7 of sub-block #1, pixels P8, P9, P12, and P13 of sub-block #2, and pixels P10, P11, P14 and P15 of sub-block #3 in similar fashion. The result is a single 16-bit mask word and eight 16-bit RGB value words. Each successive four bits of the mask word indicate whether the individual pixels of a corresponding sub-block has a high luminance or a low luminance for that sub-block. Each of the four individual sub-blocks is represented by one 16-bit RGB high value word and one 16-bit RGB low value word.

Accordingly, each high entropy block is sub-divided and compressed into nine 16-bit words: one mask word; one RGB high value word starting with a "1" bit; and seven other RGB value words starting with "0". Nine 16-bit words comprise 144 bits. The uncompressed video data comprises three 8-bit words for each of sixteen pixels for a total of 384 bits. The presently described embodiment therefore results in 384/144 video data compression for high entropy blocks. Because the proportion of low entropy blocks to high entropy blocks can be modified by adjusting the predetermined entropy value, the amount of compression can be loosely controlled.

It has been determined experimentally that with typical video images, in accordance with the invention about 30% of the blocks are subdivided. Hence in the subdivided blocks compression using for instance the prior art CCC method provides a compression of about 3 to 1 while in the non-subdivided blocks the compression ratio is approximately 8 to 1 for a total ratio of approximately 6.5 to 1. In addition to an implementation wholly in software i.e., by a computer program, it is possible to implement the present invention in electronic circuitry by logic i.e., for instance in an application specific integrated circuit which performs the necessary determinations and calculations.

To decompress one reverses the above described compression process, using as the key element of information that the first bit of each value word indicates whether that word relates to a block or a sub-block. Of course, in the decompression process some (non essential) data is lost as is true for all compression techniques.

Decompression is essentially a mirror image of the compression process and may be performed by computer software or in logic circuitry. First, the 16-bit mask word is read indicating for each pixel whether that pixel is high luminance or low luminance. Then the RGB high value is read. If the first bit in the RGB high value word is 0 that means that the block of information has not been subdivided. Thus one expects only one more color word to be provided which is the RGB low value word. This then provides the color values for each pixel in the block i.e., either the high color or low color is used for each pixel in the block.

Thus a non-subdivided block only has two different colors. For the more complex case of a block that has been subdivided, the same compression routine is followed except that additionally one must compute the luminance mean for each of the sub-blocks and the luminance value for each pixel must be compared against the luminance mean to determine whether the sub-block is a high color or low color sub-block. Again, in the compression the luminance value is used only to determine if a particular sub-block is RGB high value or RGB low value. Again, the mask is used exactly the same way as in a non-subdivided blocks. Thus for each subdivided block it is necessary to read in four pairs of RGB values instead of one pair of RGB values. Thus in a non-subdivided block the first bit in the RGB word is set to one indicating that the block has been subdivided. Of course, the system recognizes that both the subdivided block and the non-subdivided blocks have their RGB words expressed in the 555 compression technique as described above.

FIGS. 7A, 7B and 7C are a flowchart illustrating a process for carrying out one embodiment of the present invention as described above. FIG. 7A shows the first portion of the process which determines whether a particular block should be subdivided i.e., treated as an edge or not subdivided i.e., treated as a non-edge. FIG. 7B continues the process for the non-edge (non-subdivided) situation. FIG. 7C shows the process for the edge (subdivided) situation.

As shown in FIG. 7A, the process begins at step 50 with a video image (a single video frame) as described above. The video image is divided into a series of blocks each measuring 4 pixels by 4 pixels in step 52 for each block for the pixels numbered 0 through 15. The values of YMIN and YMAX which are luminance values are initialized to 0 in step 54. In step 56 each pixel is read sequentially and for each pixel in step 58 luminance is calculated based on the RGB values for that pixel. Then in step 60 it is determined if a particular pixel has a luminance value less than the minimum. If so, in step 62 the new minimum value YMIN becomes the value of that pixel's luminance. If not, in step 64 it is determined if the pixel's luminance is greater than the maximum luminance value YMAX and if yes, in step 66 the new maximum luminance value is substituted into YMAX. In step 68 it is determined if all pixels have been processed, and if there are no more pixels in step 70 the value of YMAX minus YMIN is calculated to determine if it is greater than a threshold value. The threshold value is user inputted from step 72 on a scale of 0 to 255. If in step 70 the subtracted value is not greater than the threshold then that particular block is treated as a "non-edge", i.e. not to be further subdivided. If the subtracted value in step 70 is greater than the threshold then that block is treated as an edge, i.e. is to be subdivided.

For the non-edge blocks in step 74 the flow of control is then to step 84 in FIG. 7B. The luminance sum is first initialized at 0 in step 84 and then for each pixel the luminance value is read and summed in step 88 until in step 90 all the luminance values have been so summed. In step 92 a mean luminance is computed for the block of 16 pixels. In step 94 the four variables as shown are initialized at 0. In step 96 the luminance value is read in for each pixel, and in step 98 it is determined if the luminance value for each pixel is greater than or equal to the mean luminance value. If not then in step 100 the particular bit associated with that pixel in the mask word is set to 0. In step 102 the color (RGB) values of that particular pixel are accumulated. This is continued in step 104 until all luminance values have been so treated. If however the luminance of a particular pixel is greater than or equal to the mean luminance of the block then in step 106 the associated bit in the mask word is assigned to have the value of 1. In step 108 the color values for each pixel are accumulated in the variables as shown.

Then as shown in step 110 the high mean RGB value is computed for that block by taking a mean value over all the pixels in the block. A similar computation is made in step 112 for the low mean RGB value.

Then after the high and low mean RGB values are computed for the block, in step 114 the first bit of the RGB high word is set to 0 indicating that this is a non-edge block. This value is then stored and the mask word for the block generated in step 116. Step 118 shows the two resulting RGB words which then represent the color value averages for the high color value and the low color value of that particular block expressed in 555 format, i.e. the last three least significant bits of each color value are truncated.

The video compression process for the blocks which are edges in step 76 of FIG. 7A transfers control to step 126 of FIG. 7C. In step 126 for each of the four sub-blocks 0, 1, 2, 3 of the block, in step 128 the luminance sum is initialized to 0. Then in step 130 the luminance is read in for each pixel of the sub-block, and these values are accumulated in step 132. This continues until all of the pixels have been so treated in step 134. Then the luminance mean value for the four pixels in the sub-block is computed in step 136.

In step 138 the count and color values are initialized to 0. Then in step 140 the luminance value is read in for each pixel and in step 142 the luminance mean is computed as described above however only for the sub-block. Steps 144, 146, 150 and 152 and 148 are the same as described above in FIG. 7B for respectively steps 100, 102, 106, 108, and 104. Then in step 154 the RGB high mean value for the sub-block is computed and in step 156 the RGB low mean value for the sub-block is computed.

Then in step 158 the first bit (the high bit) of the RGB high word is set as a flag with a value of 1 to indicate that this is an edge. In step 160 this process is continued until all of the four sub-blocks have been so processed resulting in step 162 of formation and storage of the mask word. Step 164 shows the resulting four pairs of color words which represent the entire block in the 555 color compression format. As shown, the lead bit of the first high word is the value 1 to indicate that this is an edge block.

It is to be appreciated that this process is one embodiment of the invention as might be carried out by a computer program, and that other modifications and ways of carrying out this process are also encompassed within the present invention. Also, the compression of the 8 bit video to the 555 bit video format is conventional and other conventional compression methods may be substituted therefor.

This disclosure is illustrative and not limiting; further modifications will be apparent to one skilled in the art in the light of this disclosure.

I claim:

1. A video compression method, comprising the steps of:
   dividing an image frame into a plurality of rectangular blocks, each of said blocks comprising a number of pixels;
   determining an information content value of each of said blocks;
   for each of said blocks having an information content value less than a predetermined value, performing compression on said block without first subdividing said block into sub-blocks of pixels; and
   for each of said blocks having an information content value greater than said predetermined value, further subdividing said block into a plurality of rectangular sub-blocks of pixels and performing compression on each of said sub-blocks.

2. The video compression method of claim 1, wherein each of said pixels has a luminance value, and wherein said step of determining an information content value of each of said blocks further comprises the step of:
   for each of said blocks, determining a range of luminance of all the pixels of said block.

3. The video compression method of claim 1, wherein said compression is a color cell compression (CCC) method.

4. The video compression method of claim 1, wherein said compression is a joint photographics expert group (JPEG) compression method.

5. The video compression method of claim 1, wherein said compression is a block truncation coding (BTC) compression method.

6. The video compression method of claim 1, wherein said steps of dividing, determining, performing compression on said block, and further subdividing and performing compression on each of said sub-blocks are performed using a microprocessor and a disk drive of a personal computer without the use of dedicated compression circuitry.

7. A video compression method, comprising the steps of:
   dividing an image frame into a plurality of rectangular blocks, each of said blocks comprising a number of pixels;
   determining an information content value of each of said blocks;
   for each of said blocks having an information content value less than a predetermined value, performing compression on said block, said step of performing a compression on said block involving the step of classifying each of said pixels of said block into groups based on a luminance of said pixel; and
   for each of said blocks having an information content value greater than said predetermined value, further subdividing said block into a rectangular sub-blocks of pixels and performing compression on each of said sub-blocks, said step of performing a compression on said sub-block involving the step of classifying each of said pixels of said sub-block into groups based on a luminance value of said pixel.

8. The compression method of claim 7, wherein said step of classifying each of said pixels of said block comprises the steps of:
   determining a mean luminance value of all pixels in said block;
   classifying all pixels in said block having a luminance value greater than said mean luminance value into a first group; and
   classifying all pixels in said block having a luminance value smaller than said mean luminance value into a second group;
   and wherein said step of classifying each of said pixels of said sub-block comprises the steps of:
   determining a mean luminance value of all pixels in said sub-block;
   classifying all pixels in said sub-block having a luminance value greater than said mean luminance value into a first group; and
   classifying all pixels in said sub-block having a luminance smaller than said mean luminance into a second group.

9. The video compression method of claim 8, wherein each of said blocks of pixels comprises sixteen pixels and wherein each of said sub-blocks comprises four pixels, wherein said step of performing compression on said block further comprises the step of generating a 16-bit mask word, a 16-bit RGB high value word, and a 16-bit RGB low value word, and wherein said step of performing compression on each of said sub-blocks further comprises the step of generating a 16-bit mask word, four 16-bit RGB high value words, and four 16-bit RGB low value words.

10. The video compression method of claim 9, wherein each of said RGB high value words and said RGB low value words comprises three 5-bit fields and one 1-bit field, said 1-bit field of at least one of said value words being indicative of whether said at least one of said value words is one of two value words corresponding with a block which has not been subdivided into sub-blocks or is one of eight value words corresponding with a block which has been subdivided into sub-blocks.

11. The video compression method of claim 7, further comprising the step of:
 determining an RGB value for each of said groups of block pixels; and
 determining an RGB value for each of said groups of sub-block pixels.

12. The video compression method of claim 11, wherein said step of determining an RGB value for each of said groups of block pixels further comprises the steps of:
 for each of said groups of pixels of a block, determining an R average value of all the pixels of said block classified into said group;
 for each of said groups of pixels of a block, determining a G average value of all the pixels of said block classified into said group; and
 for each of said groups of pixels of a block, determining a B average value of all the pixels of said block classified into said group;
 and wherein said step of determining an RGB value for each of said groups of sub-block pixels further comprises the steps of:
 for each of said groups of pixels of a sub-block, determining an R average value of all the pixels of said sub-block classified into said group;
 for each of said groups of pixels of a sub-block, determining a G average value of all the pixels of said sub-block classified into said group; and
 for each of said groups of pixels of a sub-block, determining a B average value of all the pixels of said sub-block classified into said group.

13. The video compression method of claim 12, further comprising the steps of:
 for each block, generating a data word having an R field, a G field, and a B field, said R field being indicative of said R average value of all the pixels of said block classified into a group, said group being indicated by the mask word for said block, said G field being indicative of said G average value of all the pixels of said block classified into a group, said group being indicated by the mask word for said block, said B field being indicative of said B average value of all the pixels of said block classified into a group, said group being indicated by the mask word for said block,
 for each block subdivided into sub-blocks, generating a data word having one R field, one G field, and one B field for each of said sub-blocks, each R field being indicative of an R average value of all the pixels of a corresponding sub-block classified into a group, said group being indicated by the mask word for said subdivided block, each G field being indicative of an G average value of all the pixels of said a corresponding sub-block classified into a group, said group being indicated by the mask word for said subdivided block, each B field being indicative of an B average value of all the pixels of said a corresponding sub-block classified into a group, said group being indicated by the mask word for said subdivided block.

14. The video compression method of claim 11, further comprising the steps of:
 generating a mask word for each block, said mask word being indicative of the classification of each of the pixels of said block; and
 generating a mask word for each sub-block, said mask word being indicative of the classification of each of the pixels of said sub-block.

15. A compression sequence generator of digital values representative of an image frame of RGB pixels, said image frame comprising a first plurality of blocks of RGB pixels and a second plurality of blocks of RGB pixels, each of said second plurality of blocks being subdivided into sub-blocks of RGB pixels, comprising:
 first means for generating a first sub-sequence of digital values representative of one of said blocks of said first plurality of blocks of RGB pixels, said first sub-sequence comprising:
 a mask word;
 an RGB high value word; and
 an RGB low value word; and
 second means for generating a second sub-sequence of digital values representative of one of said blocks of said second plurality of blocks of RGB pixels, said second sub-sequence comprising:
 a mask word;
 a plurality of RGB high value words; and
 a plurality of RGB low value words.

16. The apparatus of claim 15, wherein said plurality of RGB high value words comprises one RGB high value word for each sub-block of said block, and wherein said plurality of RGB low value words comprises one RGB low value word for each sub-block of said block.

17. The apparatus of claim 15, wherein each said mask word is a 16-bit word, and wherein each of said blocks comprises sixteen RGB pixels, each bit of a mask word indicating whether a corresponding one of said sixteen RGB pixels of said block is to be associated with a RGB high value word or whether said corresponding one of said sixteen RGB pixels of said block is to be associated with a RGB low value word.

18. The apparatus of claim 15, wherein each of said RGB high value words and said RGB low value words comprises three 5-bit fields of data and one 1-bit field, said 1-bit field of at least one of said value words being indicitive of indicate whether a sub-sequence containing said 1-bit field is said first sub-sequence or said second subsequence.

19. The video compression method of claim 7, wherein each of said blocks of pixels comprises sixteen pixels and wherein each of said sub-blocks comprises four pixels, wherein said step of performing compression on said block further comprises the step of generating a 16-bit mask word, a 16-bit RGB high value word, and a 16-bit RGB low value word, and wherein said step of performing compression on each of said sub-blocks further comprises the step of generating a 16-bit mask word, four 16-bit RGB high value words, and four 16-bit RGB low value words.

20. The video compression method of claim 19, wherein each of said RGB high value words and said RGB low value words comprises three 5-bit fields and one 1-bit field, said 1-bit field of at least one of said value words being indicative of whether said at least one of said value words is one of two value words corresponding with a block which has not been subdivided into sub-blocks or is one of eight value words corresponding with a block which has been subdivided into sub-blocks.

21. A video compression method, comprising the steps of:

dividing an image frame into a plurality of rectangular blocks, each of said blocks comprising a number of pixels, each of said pixels having a luminance value;

for each of said blocks, determining a range of luminance of all the pixels of said block, said step of determining said range of luminance further comprising the steps of:

determining a maximum pixel luminance of all pixels of said block; and determining a minimum pixel luminance of all pixels of said block;

for each of said blocks having a range of luminance less than a predetermined value, performing compression on said block; and for each of said blocks having a range of luminance greater than said predetermined value, further subdividing said block into a plurality of rectangular sub-blocks of pixels and performing compression on each of said sub-blocks.

22. A method, comprising:

dividing an image frame into a plurality of rectangular blocks, each of said blocks comprising a number of pixels;

step for determining an information content value of each of said blocks;

step for, for each of said blocks having an information content value less than a predetermined value, performing compression on said block, said step for performing compression comprising classifying each of said pixels of said block into groups based on a luminance of said pixel; and step for, for each of said blocks having an information content value greater than or equal to said predetermined value, further subdividing said block into a plurality of rectangular sub-blocks of pixels and for performing compression on each of said sub-blocks, said step for further subdividing and performing compression comprising classifying each of said pixels of said sub-block into groups based on a luminance value of said pixel.

* * * * *